United States Patent [19]

Miller

[11] Patent Number: 4,468,987
[45] Date of Patent: Sep. 4, 1984

[54] CONTROL SYSTEM FOR MULTI-RATIO GEARING

[75] Inventor: Albert A. Miller, Galashiels, Scotland

[73] Assignee: AB Volvo, Goteborg, Sweden

[21] Appl. No.: 261,811

[22] Filed: May 8, 1981

[30] Foreign Application Priority Data

May 9, 1980 [GB] United Kingdom ............... 8015371

[51] Int. Cl.³ ............................................ F16H 5/48
[52] U.S. Cl. ..................................... 74/862; 74/869; 74/752 A; 74/870; 74/878
[58] Field of Search ................ 74/752 A, 752 C, 867, 74/868, 869, 870, 878, 862

[56] References Cited

U.S. PATENT DOCUMENTS

| | | | |
|---|---|---|---|
| 3,631,744 | 1/1972 | Blomquist et al. | 74/868 |
| 3,650,162 | 3/1972 | Leising et al. | 74/867 |
| 3,691,872 | 9/1972 | Schaefer et al. | 74/869 |
| 3,818,783 | 6/1974 | Norris et al. | 74/869 |
| 3,886,820 | 6/1975 | Lentz | 74/867 |
| 4,036,083 | 7/1977 | McQuinn | 74/867 |
| 4,111,072 | 9/1978 | Harmon et al. | 74/867 |
| 4,136,584 | 1/1979 | Ishikawa | 74/867 |
| 4,161,895 | 7/1979 | Ushijima et al. | 74/867 |
| 4,331,046 | 5/1982 | Leonard et al. | 74/867 |

FOREIGN PATENT DOCUMENTS

| | | |
|---|---|---|
| 1173960 | 3/1959 | France . |
| 1109497 | 4/1968 | United Kingdom . |
| 1444424 | 7/1976 | United Kingdom . |
| 1462957 | 1/1977 | United Kingdom . |
| 1511721 | 5/1978 | United Kingdom . |
| 1514972 | 6/1978 | United Kingdom . |
| 2028936 | 3/1980 | United Kingdom . |
| 2029522 | 3/1980 | United Kingdom . |
| 2033500 | 5/1980 | United Kingdom . |
| 2055999 | 3/1981 | United Kingdom . |

Primary Examiner—Allan D. Herrmann
Assistant Examiner—Joseph M. Rolnicki
Attorney, Agent, or Firm—Flynn, Thiel, Boutell & Tanis

[57] ABSTRACT

A master controller can be set by the driver in any of a range of forward drive positions D1 to D6 to pre-set upper and lower limits to the engine speed in any of a range of forward ratios such that any increase or reduction in vehicle speed which would cause the engine speed to exceed the upper limit or to fall below the lower limit of the setting chosen will result in an automatic shift to the next higher or to the next lower ratio respectively. Thus gear shifts occur at lower engine speeds in setting D1 than in setting D6. An additional setting B automatically brings about a shift to whatever ratio raises the engine speed nearest to the maximum safe limit to provide the maximum engine braking effect. Road speed is sensed by a sensor which yields its maximum output signal when the vehicle is stationary, the output signal decreasing progressively with increasing road speed so that in the event of failure of disconnection of the sensor, the control system causes the transmission to shift to the highest ratio in the range. The supply of oil under pressure to friction devices is controlled through relay valves. During an upshift, the pressure in the friction device associated with the outgoing brake is released at a controlled rate until the pressure in the incoming brake or clutch reaches a predetermined value whereupon the outgoing brake is then fully released. During a downshift, the outgoing brake or clutch is released immediately when the incoming brake starts to be applied.

20 Claims, 7 Drawing Figures

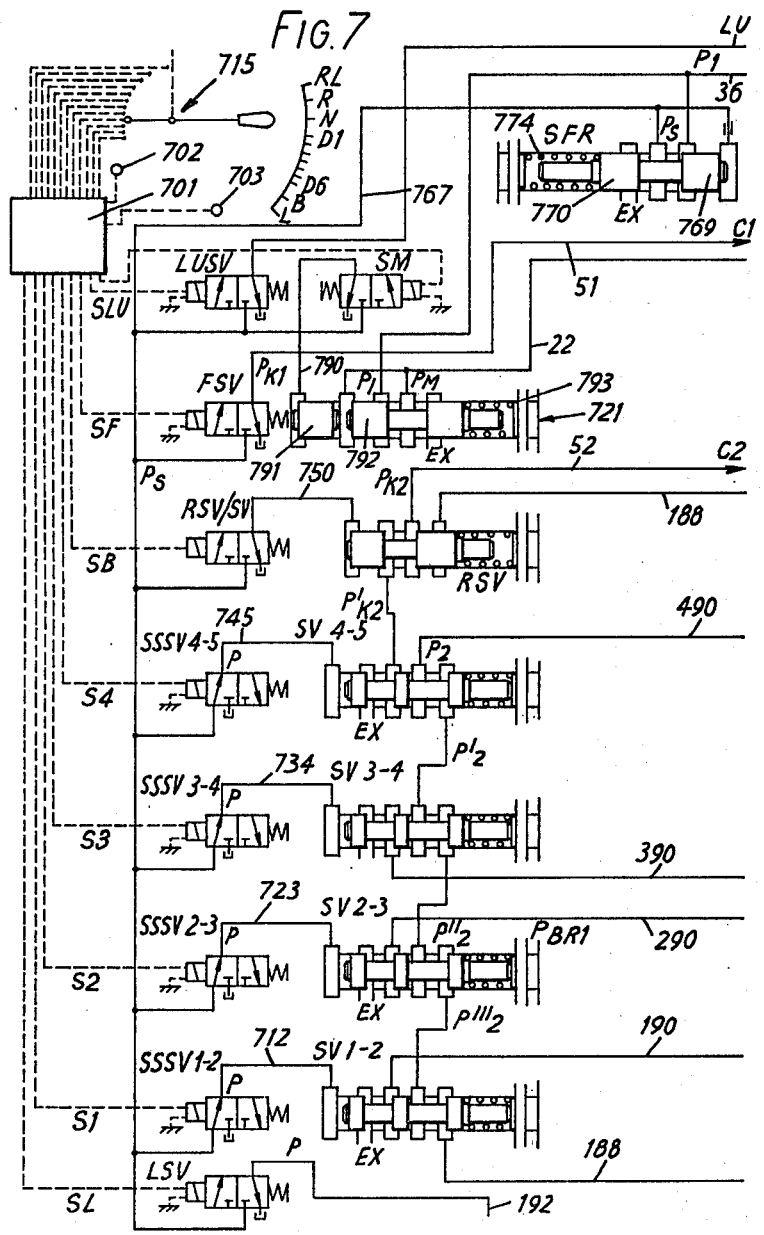

CONTROL SYSTEM FOR MULTI-RATIO GEARING

FIELD OF THE INVENTION

This invention relates to control systems for multi-ratio gearing, and more specifically a vehicle transmission for automatically causing changes between ratios of the gearing in response to varying operating conditions.

BACKGROUND OF THE INVENTION

According to one aspect of the invention there is provided a control system for a multi-ratio gearing for automatically causing changes between ratios of the gearing, in response to variations in rotational speed in the gearing, in which a driver-operated control is provided for biassing the control system to raise or lower the threshold rotational speeds at which changes are initiated, and the resultant threshold speeds are unaffected by the control (i.e. the throttle pedal) for power applied to the transmission over the normal range of movement of the power control, the selected setting of the driver operated control being effective over a range of inter-ratio changes.

British Patent Specification No. 1,444,424 discloses a shift pattern control device in which pressures corresponding to engine output torque and to vehicle speed are applied to opposite end faces of a shift valve member. A driver-operated control enables the driver to vary the shift points to some extent but at all times the shift pattern control device is responsive to engine output torque.

It can be shown that when movement of the throttle or power control member has such an inseparable and important influence on the gear shifting threshold, some very undesirable and even dangerous effects can result when the throttle has to be suddenly shut or reduced. For example, when approaching a roundabout or other temporary restriction on an upward gradient with the throttle open and the transmission operating in a low or intermediate ratio, the driver would prefer to retain the low or intermediate ratio while negotiating the restriction, but because he wishes to reduce speed he must raise his foot from the throttle pedal (possibly even to apply the brake pedal) and consequently the threshold is changed to the extent that the transmission shifts to a higher ratio. When he again opens the throttle, for example to accelerate out of the roundabout, the transmission is compelled to shift down again to a lower gear ratio.

Apart from the fact that gearshifting contrary to the wishes and expectations of an experienced driver of a manually-shifted transmission are disconcerting, it can also result in impulsive changes in tractive effort which impair adhesion to the road surface at a time when a heavily loaded vehicle may be subjected to sideways accelerations due to the curvature of the track, as when negotiating a roundabout.

On icy or otherwise slippery surfaces the danger of skidding is further enhanced. In such circumstances if opening the throttle precipitates a downward gearshift, there is great danger that the extra tractive effort suddenly released will cause the driving wheels to slip, and the increases rotational speed of the transmission due to slip will bring about a series of upward shifts, thus further increasing the slip velocity at the wheel treads and so aggravating the situation.

Such problems are mitigated by this aspect of the invention, an essential feature of which is that movement of the throttle pedal in any part of its normal driving range has no influence on the gearshifting threshold, but instead, the driver has a separate member for varying the threshold in terms of vehicle speed, which is not in any way influenced by the position of the throttle pedal.

According to another aspect of the invention, there is provided a control system for a multi-ratio automatic transmission for automatically causing changes between ratios in a range of ratios in response to variations in an output signal from an output-speed-responsive governor of the transmission, wherein the strength of the output signal from the governor decreases with increasing output speed and the control system is arranged to respond to the decreasing signal strength by correspondingly upshifting the transmission and to respond to absence of signal by upshifting the transmission to the highest ratio in the said range.

British Patent Specification No. 1,514,972 discloses an electronic control system including an evaluating circuit for the output signal for an engine-speed-detecting governor. The governor produces an output proportional to engine speed and thus, in any particular gear ratio, proportional to output speed. The evaluating circuit produces from the governor output an output inversely proportional to the governor output. However, the evaluating circuit is located in an electronic module including the other control circuits for the transmission. Accordingly any failure of the governor or its connection line to the module must result in downshifting of the transmission to or towards the lowest ratio. If this were to occur at high vehicle speed, the result could be disastrous for example by gross overspeeding of the engine or by causing skidding due to the tendency of the lower gear to lock the driving wheels.

BRIEF DESCRIPTION OF THE DRAWINGS

These and other aspect of the invention will now be described in more detail by way of example with reference to the accompanying drawings, in which:

FIG. 7 shows a modification of the arrangement shown in FIG. 5 for use with electronic controls.

DETAILED DESCRIPTION

Figure 1:
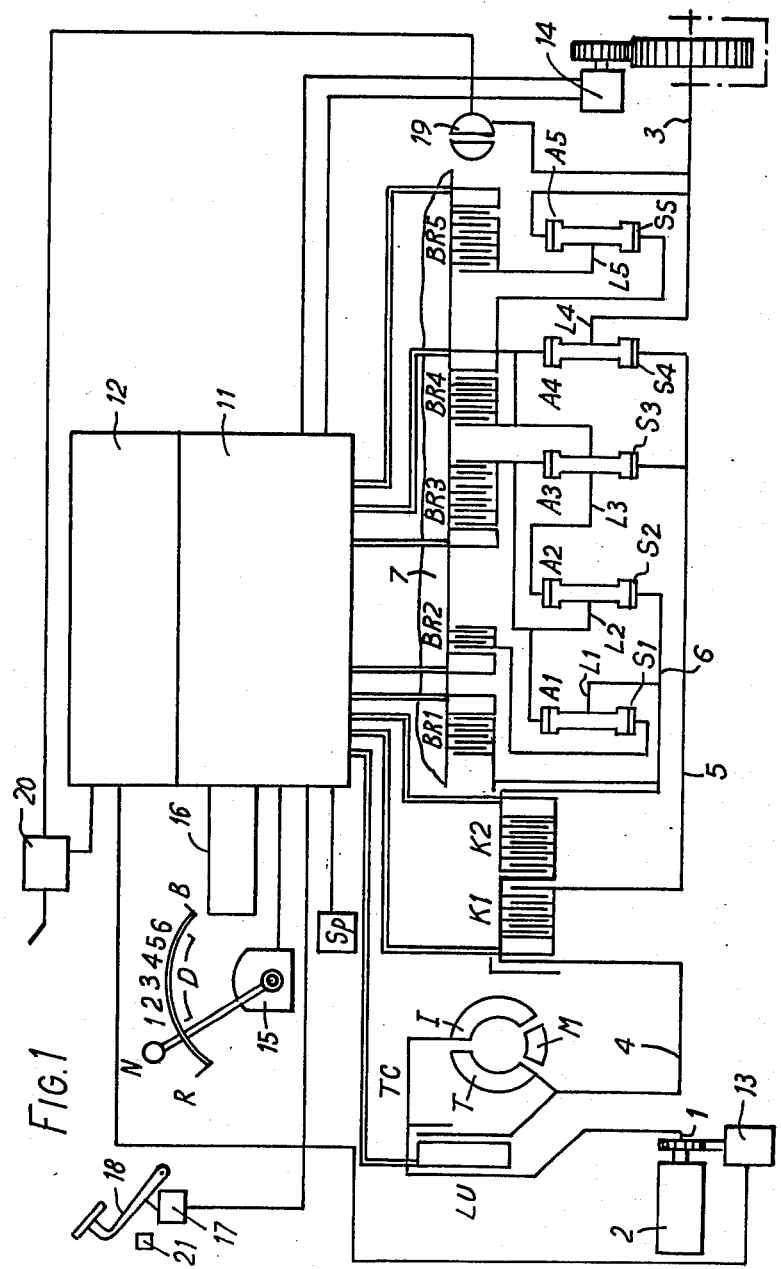
FIG. 1 is a diagrammatic axial section through a change speed power transmission for a vehicle together with a block diagram of an automatic control system for the transmission.

The automatic change-speed power transmission shown diagrammatically in FIG. 1 serves to transmit power from the output shaft 1 of a vehicle engine 2 to an output shaft 3 which drives one or more pairs of road wheels of a vehicle in which the transmission is installed, through a final drive (not shown).

The engine shaft 1 drives the impeller I of a torque converter TC, the turbine T of which is mounted on a shaft 4 coaxial with the shaft 1. The reaction member M of the torque converter is connected in the usual way through a one-way clutch (not shown) to a stationary part of the transmission casing. A hydraulic pressure-operated lock-up clutch LU has its input connected to the impeller I and input shaft 1 and its output connected to the shaft 4 and thus, when engaged, locks the impeller of the torque converter to the turbine T.

A shaft 4 has secured to it the input members of two further hydraulic pressure operated clutches K1 and K2. The output member of the clutch K1 is carried by a shaft 5 coaxial with the shafts 1 and 4 while the output of the clutch K2 is carried by a hollow shaft 6 surrounding part of the shaft 5.

The shafts 5 and 6 drive into gearing comprising five epicyclic gear sets each consisting of a sun gear S, an internally toothed annulus A and a set of pinions meshing with both the sun gear and annulus and rotatably mounted on a planet carrier L. The planet carrier L1 of the first set together with the sun gear S2 of the second set are mounted on the shaft 6. The planet carrier L2 of the second set is fixed to the annulus A1 and the annulus A3. The annulus A2 is connected to the planet carrier L3, the annulus A4 and the sun gear S5. The sun gears S3 and S4 are mounted on the shaft 5. The planet carrier L4 and the annulus A5 are each secured to the output shaft 3. Five hydraulically pressure operated brakes BR1, BR2, BR3, BR4 and BR5 mounted in the transmission casing 7 are independently operable to hold respectively the shaft 6, the sun gear S1, the annulus A3 (and with it the planet carrier L2 and annulus A1), the annulus A4 (and with it the annulus A2, planet carrier L3 and sun gear S5) and the planet carrier L5. Six forward ratios, two reverse ratios and neutral are obtainable by engaging selected clutches and brakes as set out in table 1

TABLE 1

| | |
|---|---|
| Neutral: BR4 | |
| Low: K1 + BR5 | Low Reverse: K2 + BR5 |
| 1st: K1 + BR4 | Reverse: K2 + BR4 |
| 2nd: K1 + BR3 | |
| 3rd: K1 + BR1 | |
| 4th: K1 + BR2 | |
| 5th: K1 + K2 | |

It will be noted that to shift between any two adjacent forward ratios, it is only necessary to release one of the brakes (or clutch K2) and engage another. Each of the clutches and brakes is engaged by the application of hydraulic pressure to its actuating piston in a conventional manner from an automatic control system 11 which is supplied with fluid in the form of an automatic transmission oil at appropriate pressures from a pressure supply system 12 which itself receives fluid under pressure from a pump 13 driven by the engine 2.

The automatic control system 11 responds to a governor 14 driven by the output shaft 3, thus giving a signal determined by the road speed, and to driver-operated controls which include a master range selector 15 and a low range selector 16 as well as a torque-responsive device 17 which in this case is coupled to the normal throttle control 18.

In addition, a hydrodynamic retarder 19 may be connected between either the output shaft 3 or the shaft 4 and the transmission casing and can be filled to varying extents by the driver by means of a retarder valve 20.

A further driver-operated control Sp enables the driver to hold the ratio which is engaged when he operates the control so as to retain the transmission in that ratio throughout the safe speed range of the engine. As will be explained in detail below, the control system 11 effects automatic selection of gear ratios (other than low forward and the reverse ratios) under a measure of driver control which is independent of the engine throttle opening. In addition to the normal reverse (R) and neutral (N) positions, the master range controller 15 has a range of, for example six, forward positions D1...D6 each of which prescribes the engine speeds at which upward and downward shifts will occur irrespectively of the particular intermediate ratio which is engaged at the start of a shift. Thus, with a light load, when the driver does not require full power, he sets his master control at one of the lower positions (i.e. towards D1) so that shifts occur at relatively low engine speeds. When full engine power is required he can set the master range control at D6. When the maximum braking effect available is required from the engine, the driver can set his master range control 15 to a position B corresponding to a maximum engine speed slightly greater than the normal governed maximum speed of the engine but below the critical speed at which the engine may be damaged. Only when the engine speed attempts to rise above this maximum speed will the transmission shift upwards to the next ratio.

The transmission may include the normal "kick-down" control 21 which is arranged to cause the automatic control 11 to shift down one ratio when the throttle control 18 is moved to or just beyond the position of maximum throttle opening.

The governor 14 is constructed to give an output speed signal, in this case a hydraulic pressure, which decreases with increasing speed of the output shaft 3. Accordingly, if the governor should fail or its connection to the automatic control system 11 be broken, the control system will automatically shift into the highest ratio, thereby avoiding the risk of dangerous over speeding of the engine.

FLUID PRESSURE SUPPLY SYSTEM 12

Figure 2:
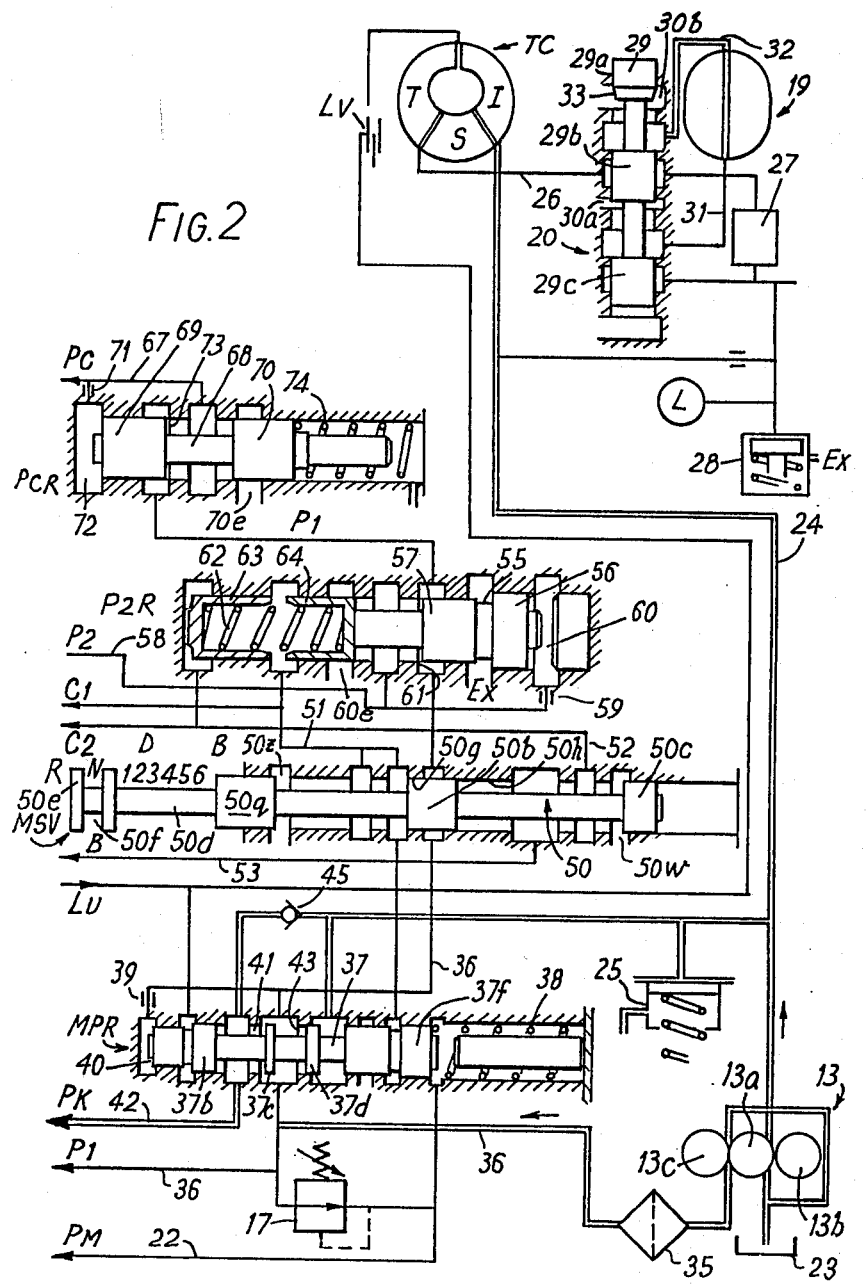
FIG. 2 is a circuit diagram of the means for generating and controlling the various oil supplies for the transmission control system.

A circuit diagram of the fluid pressure supply system is shown in FIG. 2. The engine-driven oil pump 13 is a double gear-type pump having a central gear 13a meshing with two further gears 13b and 13c. The gear pump formed by the gears 13a and 13b draws fluid from the sump 23 in the bottom of the gear casing and delivers it to a radially inner portion of the impeller I of the torque converter TC through a line 24. The pressure in the line 24 is regulated by a pressure relief valve 25 which opens to spill any excess oil back to the sump 23. Oil leaves the torque converter through a line 26 from a point adjacent the radially inner part of the turbine T where the pressure is greater than in the line 24. The line 26 extends through an annular groove in the retarder control valve 20 to an oil cooler 27 and thence to a lubrication circuit L for the gearing and associated equipment, the pressure in the circuit L being held at a suitably low level by a lubrication pressure regulator 28 which permits surplus oil to spill off to the sump.

To bring the retarder 19 progressively into operation, the valve member 29 of the retarder control valve 20 is moved progressively downwards (as seen in FIG. 2). The first part of the downward movement of the valve member 29 causes a piston portion 29b of it to close off a connection to exhaust 30a from a line 31 leading to the retarder. A further piston portion 29a on the valve member 29 has a chamfered surface 33 which, on this initial downward movement, partially closes the connection to exhaust 30b of a second line 32 leading to the retarder. Further movement of the piston portion 29b and of a further piston portion 29c open ports which connect the converter outlet 26 to the line 32 and the line 31 to the outlet of the cooler 27. Oil will then flow into the retarder 19 but the amount of oil which is retained in it depends on how far the valve member is moved downwards towards closure of the upper exhaust port by the surface 33. The more it is closed, the more oil will be retained in the retarder with corresponding increase in the retarding effect exerted by the retarder. Since the retarder develops a greater oil pressure at its outlet than at its inlet, some of the oil will be recirculated through the cooler 27.

The gear pump formed by the central gear 13a meshing with the gear 13c also draws oil from the sump 23 and supplies it under pressure through a filter 35 to a line 36 in which the pressure is maintained at a pressure P1 by a main pressure regulator MPR having a spool-type regulator piston 37 urged to the left (in FIG. 2) by a spring 38. The pressure P1 in the line 36 is applied through a constriction 39 to the left hand end face 40 of the piston 37. When the pressure P1 becomes high enough to displace the piston to the right against the spring 38, a piston portion 37c of the piston 37 uncovers a port 41 to allow oil to spill into a line 42 at a pressure Pk. When the pressure Pk becomes equal to P1, any further rise in the value of these two pressures is prevented by the resulting further movement of the piston 37 to the right until a portion 37d of the piston 37 moves out of a port 43 to allow oil to spill from the line 36 into the torque converter supply line 24 the pressure in which is lower than P1.

When the pressure Pk drops below the pressure in the torque converter supply line 24, oil will flow from the latter through a non-return valve 45 into the line 42 to assist in filling the actuating cylinder of whichever brake or clutch may be in the process of being engaged as will be described later. Any reduction of pressure in the line 36 below that called for by the main pressure regulator will begin to close the port 41 causing a reduction of pressure Pk in line 42 so as to maintain the pressure P1 in line 36 substantially unchanged.

The piston 37 has additional piston portions 37b and 37f having annular areas exposed to ancillary pressures developed in the system as will be described later.

The master range controller 15 operates a manual selector valve MSV having a spool-type piston 50 which has three piston valve portions 50g, 50b and 50c and an extension 50d terminating in a head 50e formed with a groove 50f for engagement by a fork linked to the master controller hand lever. In the "neutral" position N of the valve member 50 shown in FIG. 2, the piston portion 50b cuts off the P1 supply line 36 from other portions of the valve. When the valve member 50 is moved to the right to any of the forward drive positions D1 to D6 or to position B, the piston portion 50g cuts off a line 51 from exhaust 50e and the piston portion 50b moves out of a bore 50g so that pressure P1 from a line 36 is admitted to the line 51 as pressure C1 for engaging the forward drive clutch K1.

When the valve member 50 is moved fully to the right to the B position, the piston portion 50b moves out of a bore 50h and delivers P1 pressure from the line 36 to a line 53 as pressure B.

When the valve member is moved to the left to the reverse position R the piston portion 50c closes off a line 52 from exhaust 50w and the piston portion 50b moves leftward out of the bore 50h to allow the pressure P1 from line 36 to be applied to the line 52 as a pressure C2 for operating the reverse clutch K2.

A further regulator valve P2r derives from the line 36 a pressure P2 which is lower than P1. The regulator P2r has a piston valve member 55 formed with a larger piston portion 56 and a smaller piston portion 57. The pressure P2 is to be supplied to a line 58 which is connected (through a constriction 59) to a space 60, where it is applied to the end face of the larger piston portion 56 to urge the piston 55 to move to the left in FIG. 2 to cause the smaller piston portion 57 to close a port 61 through which oil is supplied from the line 36 to the line 58. This movement is opposed by a spring 62 the effect of which is augmented when either clutch K1 or clutch K2 is engaged, under which conditions a pressure (C1 or C2) substantially equal to P1 is applied to an area of additional pistons 63 and 64 of effective area equal to that of the smaller piston portion 57. As a result, the value of P2 is increased whenever either clutch is engaged by an amount which varies with the value of P1 at any time and which is a fraction of P1 in the ratio of the areas of the smaller and larger piston portions 57 and 56. When both clutches are disengaged, the piston 55 will move to the left to cut off the supply from the line 36 and, if necessary to exhaust some oil from the line 58 into exhaust 60e until the lower value of the pressure P2 is restored whereupon the piston will return under the force of spring 62 to a position similar to that shown in FIG. 2.

A further pressure regulator PcR derives a constant pressure Pc from the line 36 and supplies this pressure Pc to a line 67. The regulator PcR has a spool type valve member 68 having two spaced piston portions 69 and 70 of equal diameter. The pressure in the line 67 is applied through a constriction 71 to a space 72 where it is applied to the end face of the piston portion 69 to urge the valve member 68 towards the right in FIG. 2 to cause the piston portion 69 to close off a port 73 through which oil passes from the line 36 to the line 67. Such movement if continued would cause the piston portion 70 to uncover an exhaust port 70e connected to the line 67 but an equilibrium position is maintained by a spring 74 which in the position shown in the drawing exerts a force equal to the product of Pc and the area of the piston portion 69.

ROAD SPEED GOVERNOR 14

The governor 14 (FIG. 3) derives from the pressure Pc a pressure Pg which decreases from a maximum equal to Pc at zero road speed, such that the difference Pc−Pg is approximately proportional to the road speed over a selected range of speed. The governor comprises a shaft 81 carrying a gear wheel 82 meshing with a gear wheel 83 on the output shaft 3. The governor shaft 81 has an enlarged hollow portion 84 which rotates in the bore in the governor casing 85 and has three grooves 87, 88 and 89 which extend around the full circumference of the portion 84 and are in permanant communication respectively with exhaust to the sump, the line 80 in which the pressure Pg is to be maintained, and the line 67 which is maintained at the constant pressure Pc. A valve member 91 has two spaced piston portions 92 and 93 and is slidable in the interior of the hollow portion 84. The pressure Pc in the line 67 is applied to the left hand end of the piston portion 92. The piston portion 93 is formed with a bore 94 between its two end faces so that the pressure Pg in the line 80 is applied to the right hand end face of the piston portion 93 through the groove 88 and communicating ports 95, the interior of the hollow shaft portion 84 and the bore 94. Accordingly, the pressures Pc and Pg exert a net force on the valve member 91 proportional to the difference between Pc and Pg.

A fly-weight system 100 applies to the valve member 91 an axial force (to the left in FIG. 3) which is approximately proportional to the speed of the output shaft of the transmission throughout a selected range of speed of the latter. The fly-weight system 100 comprises a pair of relatively light bell cranks 102 mounted on pivots 103 on an extension 104 of the shaft 81. The shorter arms 105 of the bell cranks 102 bear against a head 106 on the push rod 101. The fly-weight system 100 also includes a pair of heavier arms 107 which are also mounted on the pivots 103 and are extended inwards to form projections 108 which form seats for compression springs 109 the outer ends of which bear against the longer arms of the bell cranks 102. Outward pivotal movement of the arms 107 about the pivots 103 is limited by engagement of the projections 108 with stops 110 fixed to the frame 104.

Figure 3:
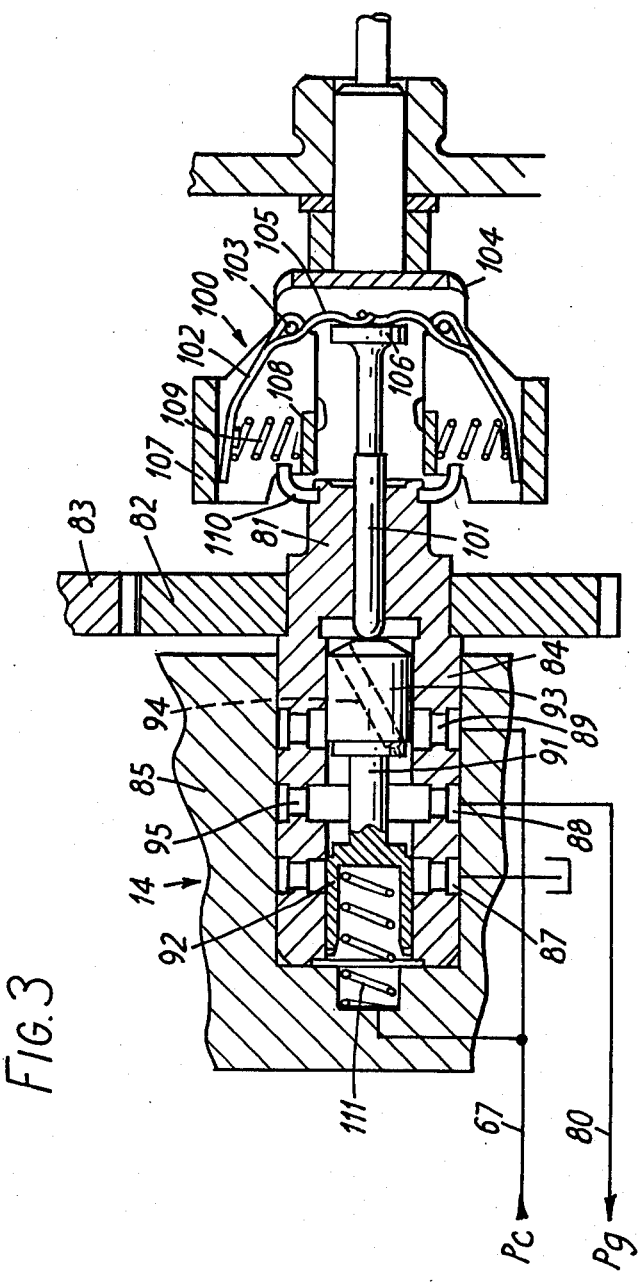
FIG. 3 is an axial sectional view of the pressure governor responsive to the output speed of the transmission.

In operation, with the output shaft stationary, the components of the governor take up the position shown in FIG. 3 with the piston portion 93 of the valve member 91 uncovering the ports communicating with groove 89 so that the pressure Pg in the line 80 is equal to the pressure Pc. When the vehicle accelerates away from rest, the speed of the governor shaft 81 correspondingly rises from zero and the fly-weights 102 and 107 begin to exert an increasing force (to the left in FIG. 3) on the push-rod 101. The push-rod accordingly begins to move the piston 91 to the left against a light spring 111 thereby cutting down the access of oil from the line 67 to the line 80 until the reduced value of the pressure Pg in the line 80, as applied to the right hand end of the piston portion 93 in addition to the load in the push-rod 101 again balances the constant force exerted on the left hand end of the valve member 91 by the constant pressure Pc. When a certain speed is reached, the spring 109 will have been compressed and the projections 108 will have moved into contact with the stops 110 so that when the speed further increases, the further increase in the force acting in the push-rod 101 will be due solely to the lighter fly-weight bell crank arms 102. Thus, the governor acts in two stages to produce a more nearly linear relationship between the force in the push-rod 101 and the speed of the governor shaft 81. If desired, a three stage effect could be produced by using different strengths of spring 109 on the opposite sides of the governor.

The centrifugal forces acquired by each fly-weight at any given speed increases as the centre of gravity of the fly-weight moves further from the axis of rotation and for this reason it is preferable to locate the pivots 103 in such a position that the resultant force applied to the push-rod does not increase as the push-rod moves axially to the left at any given speed of rotation. Otherwise there would be a possibility of oscillations being imposed on the value of the pressure Pg.

DRIVER-CONTROLLED VARIABLE PRESSURE Pv

The master range controller 15 includes a further pressure regulator SPR (FIG. 4) which has a plunger 113 coupled to the valve member 50 of the selector valve MSV over the range of movement of the latter's valve member corresponding to forward drive. Movement of the plunger 113 from the D1 position towards the D6 and finally the B positions progressively compresses a spring 114 interposed between the plunger 113 and a valve spool 115 having two spaced pistons portions 115a and 115b. As the master controller is moved from the neutral position N to the D1 position, the spring 114 is compressed sufficiently to move the valve member 115 to a position in which the piston portion 115b just emerges from a bore 116 interconnecting the line 36 (at P1 pressure) with a line 117. The pressure in the line 117 is applied through a constriction 117a to a space 117b in which it acts on the end face of the piston portion 115b in opposition to the spring 114. Thus, when the pressure in the space 117b rises to a sufficient value, it exerts a force on the valve member 115 balancing the force exerted by the spring 114. The valve member 115 will then with increasing pressure in the space 117b start to move against the spring 114 to close the gap between the piston portion 115b and the bore 116 until an equilibrium position is obtained in which the pressure Pv in the line 117 is proportional to the force exerted by the spring 114. Accordingly, progressive movement of the plunger 113 towards the D6 and B positions causes corresponding progressive increase in the pressure in the line 117.

The line 117 is connected to a space 118 of a brake and kickdown regulator BKR. The space 118 normally communicates through a bore 119 with a space 132 in the regulator BKR and thus with a line 121 leading to a space 122 in a shift-point inhibitor valve SPI which has a spool-type valve member 123 which in its normal condition connects the line 121, and thus normally, the driver-controlled pressure in the line 117, with a line 124.

When the driver wishes to inhibit the control system from shifting to a lower ratio, he operates the control to energize the solenoid valve Sp to apply P1 pressure from the line 36 to the lefthand end of the valve member 123 to move the latter against a return spring 125 into a position in which the lefthand piston portion 123a of the valve member 123 isolates the line 124 from the line 121 while the righthand piston portion 123b connects the line 124 to the exhaust 124e.

Figure 4:
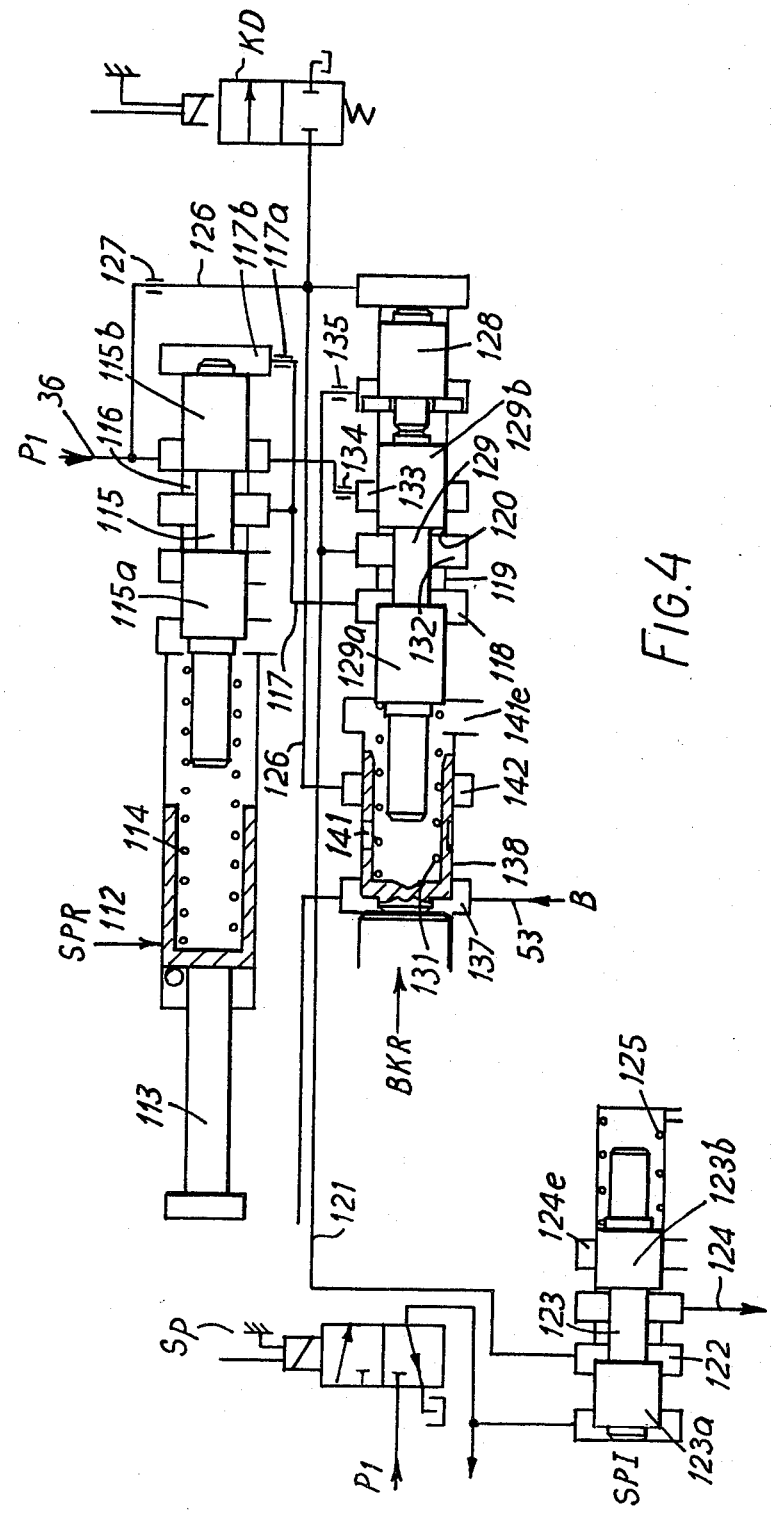
FIG. 4 is a circuit diagram of the means enabling the driver to adjust the shift points at which changes are initiated.

When the driver operates the kickdown device 21 by fully depressing the accelerator pedal 18, (FIG. 1) the kickdown device 21 operates a solenoid valve KD which exhausts a line 126 which is normally supplied with P1 pressure through a constriction 127. Under normal conditions, the P1 pressure in the line 126 holds a piston 128 in the brake and kickdown regulator BKR to the left as seen in FIG. 4 thereby holding a spool-type valve member 129 in the position shown in FIG. 4 against the action of a spring 131, thus establishing communication between the spaces 118 and 132. When, however, the kickdown device is operated, the spring 131 moves both the valve member 129 and the piston 128 to the right and a piston portion 129a of the valve member enters the bore 119 and thus cuts off communication between the spaces 118 and 132. At the same time, a further piston portion 129b moves out of a bore 120 connecting the space 132 to a further space 133 supplied with P1 pressure through a constriction 134. The pressure in the line 121 is however in communication with the righthand end of the piston portion 129b through a constriction 135 and consequently moves the valve member 129 to the left against the action of the spring 131 when the pressure in the space 132 and thus in the line 121 reaches a predetermined higher value than that corresponding to D6, this value being determined by the strength of the spring 131.

When the driver sets the master control 15 into the position B, P1 pressure from the line 36 is applied to the line 53 by the valve MSV (FIG. 2) and this pressure is applied to a space 137 to act on the end face of a further piston 138 housing, and forming an abutment for, the lefthand end of the spring 131. The piston 138 thus moves to the right (FIG. 4) until it encounters a stop in the valve housing. In this position, it connects the line 126 to the exhaust 141e through ports 141 formed in the piston 138 and a space 142 connected to the line 126. Accordingly the pressure at the righthand end of the piston 128 is removed and the piston 128 and the valve member 129 will moves to the right as when the kickdown device is operated. However, the value of the pressure supplied to the lines 121 and 124 will be still higher as a result of the further compression of the spring 131.

Accordingly, the circuits shown in FIG. 4 deliver to the line 124 a pressure Pv which varies in accordance with the drivers use of the various controls in the forward drive conditions in such a way that Pv has its lowest value in the D1 position, increases with movement of the control up to the D6 position, has a higher value when the kickdown device 21 is operated and has its highest value when the master controller is put to the B position. When the shift point inhibitor is operated due to energizing of solenoid Sp, the value of Pv in the line 124 is effectively zero.

AUTOMATIC SHIFT INITIATION

Automatic upward and downward shifts between any two adjacent ratios are initiated by shift signal valves SSV (FIG. 5) each of which is associated with a shift valve SV. Thus, for example, upward shifts from first to second speed and downward shifts from second to first speed are initiated by the shift signal valve SSV1-2 in conjunction with the shift valve SV1-2.

Each of the shift signal valves is responsive to the constant pressure Pc and the varying pressures Pg and Pv. Each of the shift signal valves SSV has a piston 141 in a bore extending between a space 142 supplied by the line 67 at the constant pressure Pc and a space 143 which is exhausted to the sump 23. Each valve SSV further includes a valve member 144 having three piston portions 144a, 144b, 144c spaced apart along the length of the valve member. The lefthand end (FIG. 5) of each valve member 144 faces into the space 143. The cross-sectional area of the piston 141 is a1 while the cross-sectional area of the piston portions 144a, 144b and 144c are respectively a2, a3 and a4. The righthand end face of the piston portion 144a is exposed to the output pressure Pg from the govenor 14 supplied by the line 80 to a space 145.

The driver-controlled pressure Pv is supplied from the line 121 to a space 146 where it acts on the righthand annular end face of the piston portion 144c. The space 146 communicates through a bore 147 of the same diameter as the piston portion 144c with a closed space 148. The lefthand annular end face of the central piston portion 144b is exposed to the Pv pressure in the spaces 146 and 148 when the valve is in the downshift condition shown in FIG. 5. Further, the righthand annular end face of the piston portion 144b is exposed to the constant pressure Pc in a space 149 which communicates through a bore 150 of the same diameter as the piston portion 144b with a further space 151 the pressure in which is applied to the lefthand annular face of the piston portion 144a.

Figure 5:
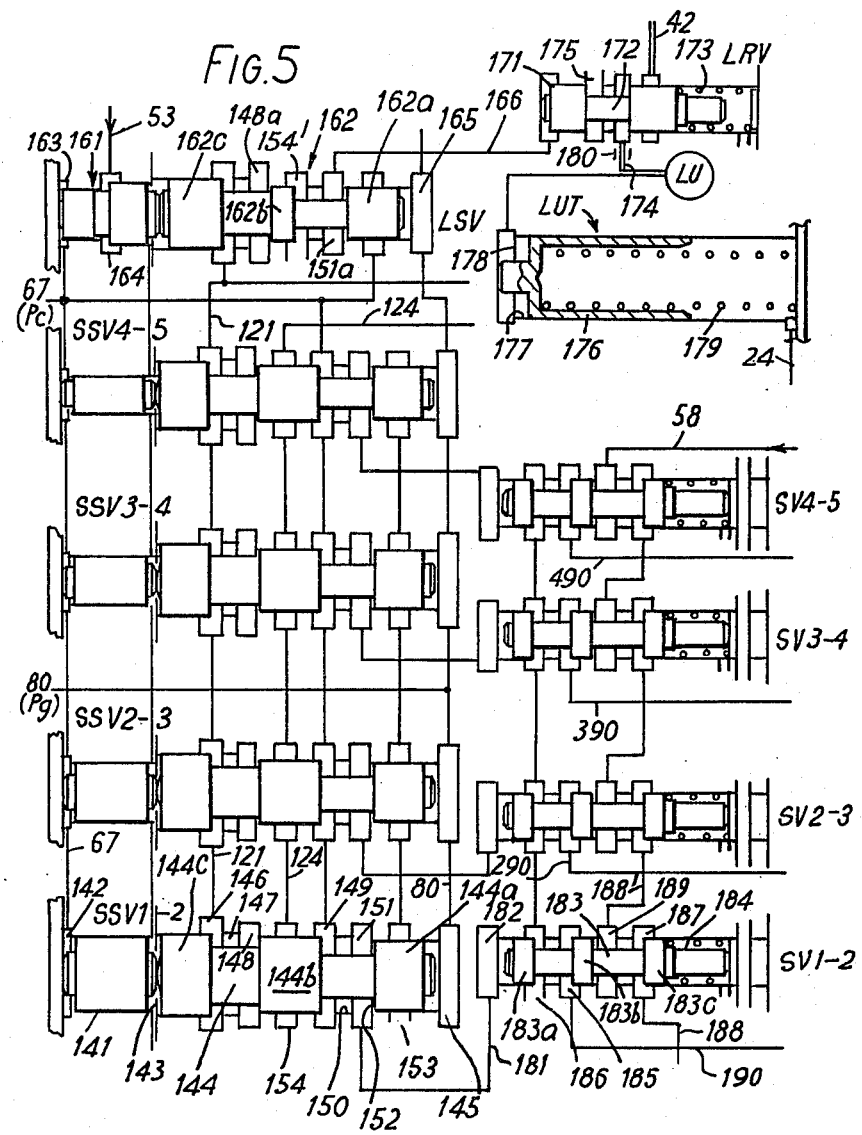
FIG. 5 is a hydraulic circuit diagram of the means in the control system for producing shift signals initiating changes between forward ratios.

Thus, in the downshift position shown in FIG. 5, the piston 141 and valve member 144 are held in their lefthand positions by a force Pg×a2. The combined forces exerted by the other pressures in the direction opposing that of Pg is: Pc (a1+a2−a3)−Pv (a4−a3). With increasing the road speed, Pg progressively reduces and correspondingly the force holding the piston 141 and valve member 144 in their lefthand positions decreases below the equilibrium value and the piston and valve member then start to move to the right. The piston portion 144b moves into the bore 150 thereby isolating the space 151 from the constant pressure Pc and at the same time the piston portion 144a moves out of the bore 152 to connect the space 151 to an exhausted space 153. The shift signal valve SSV1-2 will then only revert to its downshift condition (by movement of the valve member 144 and piston 141 to the left) when the road speed falls to a lower value (for a given value of Pv) than that at which the upshift movement occurred. Thus, the downshift will only occur when the force a2 Pg exceeds: Pc. a1−Pv (a4−a3). During the downshift movement, the restoration of the constant pressure Pc to the effective area (a3−a2) will exert a positive leftward force on the valve member to complete the downshifting movement. Thus the value of (a3−a2) can be chosen to give the required difference in road speeds corresponding to upwards and downward shifts. It will be appreciated that the individual values of a1, a2, a3 and a4 can be independantly selected for each of the shift signal valves SSV to suit the requirements of the vehicle and the characteristics of the particular gearing which is to be controlled.

Each shift signal valve in its downshift condition delivers the constant pressure Pc to its space 151 while in its upshift position the space 151 is effectively at zero pressure.

If the driver operates the SP control, the shift point inhibitor valve SPI (FIG. 4) removes the pressure Pv from the line 124 and thus from a space 154 in each valve SSV. Under these conditions, operation of the shift signal valve SSV to upshift position will cut off and exhaust Pv pressure from the region between the piston portions 144b and 144c. Consequently, when an upshift has been made, the valve will not return to its downshift condition until the vehicle speed has fallen to a value which is independant of Pv and considerably lower than the values of road speed at which downshifts would normally occur.

Engagement and disengagement of the lock-up clutch LU is initiated by a lock-up signal valve LSV which comprises a stepped piston 161 and a valve member 162. The stepped piston 161 has its free end face subjected to the constant pressure Pc in a space 163 and has an annular piston area exposed to the pressure from line 53 in a space 164. The righthand end of the piston 161 and the lefthand end of the valve member 162 are connected to exhaust. The governor pressure Pg is applied to the righthand end face of the piston portion 162a of the valve member 162 in a space 165. Correspondingly, other parts of the valve LSV correspond to those of the shift signal valves SSV with the exception that its space 154' is connected permanently to exhaust so that operation of the lock-up signal valve LSV is not effected by the operation of the shift point inhibitor. At low road speeds, the valve LSV connects its output space 151a and line 166 to exhaust while above a predetermined speed range (typically just after operation to up-shift position of the valve SSV 2-3), the piston 161 and valve member 162 shift to the right to connect the line 166 to the constant pressure Pc. During deceleration of the vehicle, the lock-up clutch will remain engaged down to a somewhat lower level of speeds in the same manner as the shift signal valves. The line 166 leads into a space 171 in a lock-up clutch relay valve LRV. When the lock-up signal valve LSV operates to deliver pressure into the line 166, this acts on the end of a valve member 172 of the relay valve LRV and moves it to the right (FIG. 5) against a spring 173 to disconnect a line 174 (supplying the lock-up clutch LU) from an exhaust port 175 and instead connect the line 174 to the line 42 (FIG. 2) at pressure PK. The rate of engagement of the clutch LU is controlled by a lock-up trimmer LUT of the usual design having a piston 176 in a cylindrical bore 177, the line 174 being connected to a space 178 at one end of the bore 177 while a spring 179 urges the piston 176 in the direction to expel oil from the bore 177 into the line 174. When the valve LRV admits oil from the line 42 to the line 174, the piston 176 is progressively moved (to the right in FIG. 5) against the action of the spring 179 which, as it is progressively compressed, increases the force that it exerts on the piston and thus the pressure in the oil. Thus the pressure applied to the lock-up clutch LU increases progressively to the value Pk. Further control of the rate of rise of the pressure in the clutch may be obtained by the use of a constriction 180 in the line 174.

The lock-up clutch LU is installed within the torque converter TC and the operating pressure applied to its piston is opposed by the torque converter charging pressure in the line 24. To conpensate for this, the pressure in the line 24 is applied to the righthand side of the trimmer piston 176 to reinforce the action of the action of the spring 179.

Before engagement of the clutch LU, the pressure Pv in the space 148a' acting on the righthand of the piston portion 162c of the lock-up shift valve LSV assists the governor pressure Pg in preventing movement of the valve member 162 to the right. However, once the valve member has moved to the right for engagement of the clutch, the piston portion 162c cuts off the supply of oil at pressure Pv from the line 121 to the space 148a and the piston portion 162b opens a port connecting the space 148a to exhaust through the space 154, so that the pressure Pv is not available to assist the governor output pressure Pg with decreasing road speed. As a result, the clutch LU will remain engaged down to a comparatively low level. When the driver operates his master controller to the position B, pressure is applied through the line 53 to the space 164 to exert a further force opposing the action of the governor pressure Pg with the result that the clutch LU will remain engaged to a still lower value of road speed. In this way, braking torque can be transmitted to the engine even at such low speeds that the torque converter (with the clutch LU unlocked) would be unable to transmit sufficient torque.

SHIFT VALVES

As explained above, when any of the shift signal valves SSV operates to initiate an upward shift, it changes the pressure in its output line 181 connected to the space 151 from Pc to zero. When a downshift is initiated, this pressure changes from zero to Pc.

The pressure in each line 181 is applied to an end space 182 of the associated shift valve SV to act on the lefthand end face of a shift valve member 183 in opposition to a compression spring 184 at the opposite end of the valve member 183. When each shift signal valve SSV is in its downshift condition as shown in FIG. 5, each valve 183 is held in its righthand end position with the spring 184 compressed, as shown in FIG. 5. In this position, the space between two piston portions 183a and 183b connects an output space 185 to an exhausted space 186. Further, an annular groove or land space separating the piston portion 183b from a further piston portion 183c interconnects a second output space 187 and output line 188 with an input space 189 connected to the output line 188' of the next higher shift valve SV 2-3 (or in the case of the highest shift valve SS4-5 to the line 58 at pressure P2).

When the shift signal valve SSV changes from its downshift to its upshift position, pressure is removed from the space 182 and the spring 184 moves the valve member 183 to the left (FIG. 5). The piston portion 183c cuts off communication between the spaces 189 and 187 and thus between the lines 188' and 188 at the same time moving out of the bore which encloses the spring 184 to connect line 188 to the exhaust passage therein. The output space 185 is isolated from the exhausted space 186 by the piston portion 183b and is instead connected to the line 188' (or in the case of the shift valve SV4-5, the line 58) to receive P2 pressure.

Thus, when the associated shift signal valve SSV is in its downshift position, the output supplied by a space 185 to output lines 190, 290, 390, 490 is zero while when the associated shift signal valve SSV is in its upshift position, the output is at P2 pressure.

GEAR SHIFTING

Figure 6:
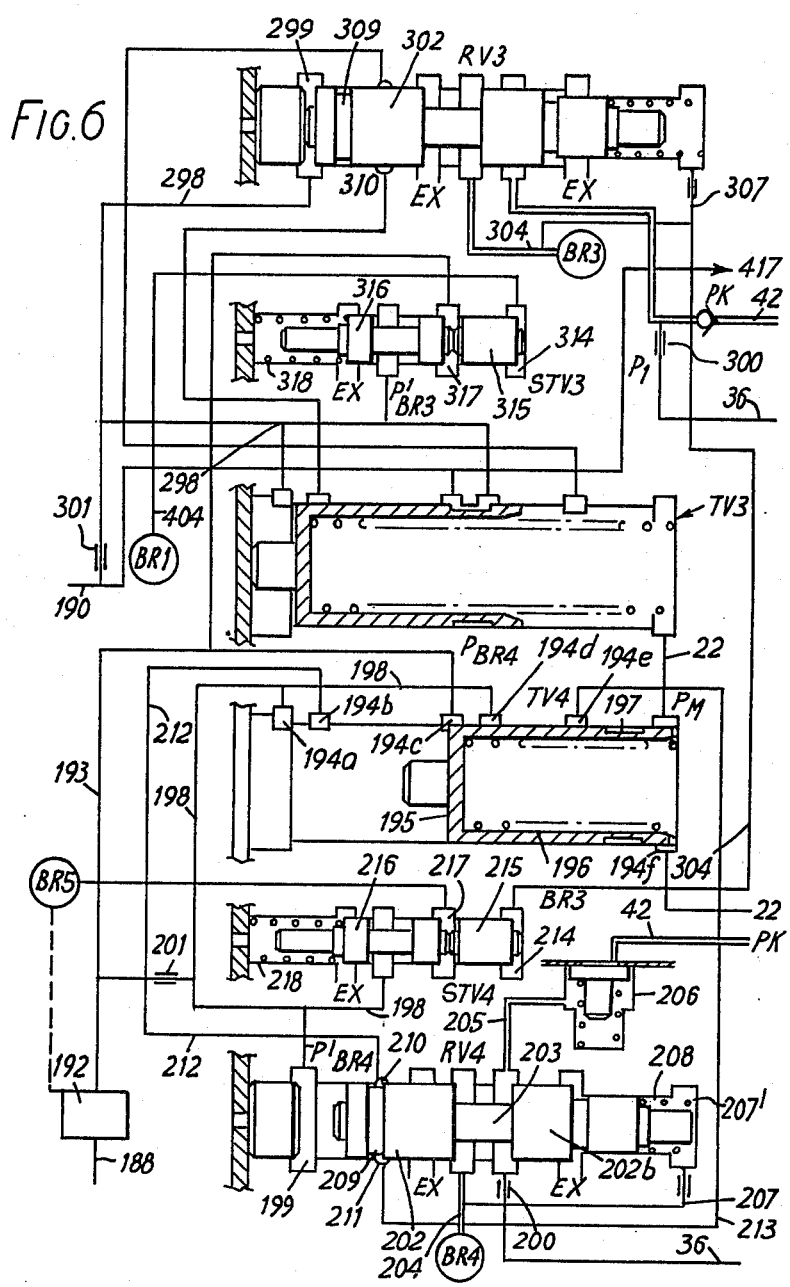
FIG. 6 is a hydraulic circuit diagram of the means in the control system associated with the holding brakes for two forward ratios and responsive to appropriate upward and downward shift signals.

FIG. 6 shows the circuit diagram of the arrangement for effecting shifts between two adjacent forward ratios, in this case first and second speeds, in responses to changes in the state of the associated shift valve, in this case SV1-2. When an upward shift is demanded by valve SV1-2 applying P2 pressure to line 190 (FIGS. 5 and 6) brake BR4 is to be released while brake BR3 is to be engaged. When the valve SV1-2 commands a down change, brake BR3 must be released and brake BR4 engaged. The timing of such upshifts and downshifts to avoid shocks is effected by the arrangement shown in FIG. 6.

Associated with each brake (BR4, BR3) is a respective relay valve RV4, RV3, a timmer valve TV4, TV3 and a shift timing valve STV4 and STV3.

In general terms, when any particular brake is to be engaged during a gear shifting operation, the delivery of oil to the operating cylinder of the brake to be engaged is controlled by the associated relay valve so as to rise as a multiple of the increasing pressure within the trimmer valve (which acts as a pressure accumulator) to which oil is fed from the constant pressure P2 supply through a constriction. By thus arranging that the pressure within the trimmer is only a fraction of that within the brake cylinder, while proportional to it, the operating pressures of the trimmers are lower and their orifices are larger, with less risk of becoming blocked with small foreign particles.

During an upshift, the outgoing brake cylinder retains sufficient pressure to maintain the driving reactions while the incoming brake takes up its slack and becomes pressurised sufficiently to take over the drive reaction in the higher ratio. This is achieved by arranging that the trimmer valve of the outgoing brake discharges through a constriction after it has been cut off from the P2 supply. During a downshift however it is preferred to release the outgoing brake or clutch immediately, thereby deliberately interrupting the drive for a short period to enable the engine speed to increase to synchronise with the lower gear ratio to be engaged. This is achieved by the shift timing valve.

When the vehicle is at rest, each of the shift valves is in its downshift position and P2 pressure is delivered from line 188 through a control system 192 for the extra low gear to a line 193. The control system 192 for the extra low gear preferably compares Pg with Pc in such a manner as to connect line 188 directly to line 193 when the vehicle speed exceeds the maximum appropriate for the extra low gear even though the latter has been selected, so that the extra low gear is disengaged.

Oil flows through the line 193 to a port 194c in the casing of the trimmer valve TV4. The trimmer valve has a hollow piston 195 which is urged to the left as seen in FIG. 6 by a spring 196 the effect of which is supplemented by the pressure PM which is applied through a port 194f. Initially, the piston 195 is at its lefthand end position in which a groove 197 in its side wall connects the port 194c with a port 194d connected by a line 198 to both a port 194a at the lefthand end of the trimmer casing and to a space 199 at one end of the relay valve RV4. Thus, oil flows freely through the port 194a into the interior of the trimmer valve and begins to move the piston 195 to the right against the action of the spring 196 and pressure PM. In the initial part of such movement, the groove 197 moves out of communication with the port 194c so that oil can now only reach the trimmer valve TV4 from the line 188 through a constricted line 201 leading into the line 198 and thus the port 194a.

The initial build-up of pressure in the trimmer TV4 also occurs in the space 199 and acts on a valve member 202 of the relay valve RV4 to move it to its righthand end position as shown in FIG. 6, against the action of its light return spring 207'.

In this position, a central smaller diameter portion 203 of the valve member 202 places a line 204 leading to the cylinder of brake BR4 in full communication with a line 205 supplied with oil from line 42 at pressure Pk through a non-return valve 206, augmented by a supply from the P1 pressure line 36 restricted by a constriction 200 so as to fill the brake cylinder and to take up any slack. The pressure in the line 204 is applied through constricted line 207 to a space 208 at the righthand end of the relay valve RV4 where it acts on an effective end surface area of the relay valve member 202 which is smaller than that subjected to the pressure in the space 199 at the lefthand end of the valve.

With the valve member 202 in its righthand end position, a groove 209 in its cylindrical surface connects a port 210 with a port 211. As the pressure in the trimmer valve TV4 begins to rise and the trimmer valve member 195 continues to move to the right, the valve member uncovers a port 194b through which the pressure in the trimmer valve is applied to a line 212 to the port 210 and thus through the groove 209 to the port 211 and thence to a line 213 leading back to a port 194e which is positioned to admit oil to the opposite side of the piston 195. Accordingly, the spaces on the opposite sides of the piston are in communication and the piston 195 is thus locked against movement so long as the relay valve member 202 remains in the righthand end position in which the groove 209 interconnects the ports 210 and 211.

As the pressure in the brake cylinder BR4 rises and the brake begins to be progressively engaged, it reaches a value which exceeds the pressure in the space 199 sufficiently to begin to move the relay valve member 202 to the left, thus cutting off communication between the ports 210 and 211. This frees the trimmer valve piston 195 which again begins to move to the right with consequent further compression of the spring 196 and increasing the pressure within the line 198. The relay valve member 202 takes up a balancing position in which its righthand portion 202b controls the flow of pressure oil from the line 205 to the line 204 in such a manner that the pressure in the brake BR4 is proportional to the pressure in the line 198 (in the ratio of the areas of the left and righthand end faces of the valve member 202). When the trimmer valve member 195 reaches its righthand end position, the full operating brake pressure is applied to the brake cylinder BR4.

UPSHIFT

When the shift valve SV1-2 changes state to command an upshift, it applies P2 pressure to line 190 which begins to engage the brake BR3 in the same manner as has just been described in respect of brake BR4. At the same time, the shift valve SV1-2 connects the line 188 and 193 to exhaust. Oil begins to leave the trimmer valve TV4 through the port 194c freely until the latter port is closed by leftward movement of the piston 195. This reduction in pressure, as multiplied by the relay valve RV4, results in the pressure in the brake BR4 being reduced so as to remove some of the normal margin of safety against slipping while first speed is fully engaged. Thereafter, the reduction in pressure in the trimmer valve TV4, and correspondingly the pressure in the brake BR4, takes place at a lower rate since oil can now only leave the trimmer valve TR4 through the constricted line 201. Brake BR4 is still however able to hold against the torque reaction on it.

The pressure in line 205 is maintained at substantially P1 pressure by communication with line 36 through the constriction 200, while the nonreturn valve 206 prevents its escape to the line 42 even when the pressure in the line 42 drops to a low value as a result of initial filling of the cylinder of the brake BR3.

The pressure in the line 304 supplying the brake cylinder BR3 is applied to an end space 214 of the shift timing valve STV4. The shift timing valve STV4 has a piston valve member 215 and a spool valve member 216 which have reduced portions normally in contact with each other in a space 217, both valve members being urged to the right in tandem by a spring 218. During an upshift, as the pressure in the brake BR3 increases, a point is reached at which the brake pressure applied to the space 214 moves the valve members 215,216 against the action of the spring 218 until the spool valve member 216 connects the line 198 to exhaust. The space 199 in the relay valve RV4 and the trimmer valve TV4 are then immediately exhausted so that the brake BR4 is then fully released.

Pressurisation of the brake BR3 from the PK line 42 and from the P1 line 36 then continues through the value at which it ceases to slip and then up to the full operating pressure which provides the margin of safety.

DOWNSHIFT

When the shift valve SV1-2 commands a downshift from second to first ratio, it connects the line 190 to exhaust and applies P2 pressure to the line 188 and thus to the line 193. This applies P2 pressure to the space 317 of the shift timing valve STV3 without delay. As a result, the valve member 316 of this valve is moved to compress the spring 318 and exhaust the line 298 supplying the trimmer valve TV3 and also exhausting the space 299 of the relay valve RV3. The valve member 302 of the relay valve RV3 immediately moves into the position shown in FIG. 6 in which it exhausts the brake cylinder BR3 substantially instantaneously. This, through the line 304, exhausts the space 214 of the shift timing valve STV4, allowing the valve member 216 to be moved to the right by the spring 218 into a position in which it cuts off the line 198 from exhaust. The relay valve RV4 and trimmer valve TV4 then control the filling of the cylinder of the brake BR4 as described previously. While the valve member 202 of the relay valve RV4 is in the position in which its groove 209 interconnects the ports 210 and 211, corresponding to initial filling of the cylinder of the brake BR4, the transmission is effectively in neutral, allowing the prime mover to accelerate somewhat towards the appropriate speed for the lower ratio to be engaged.

The modulator pressure PM is determined by the modular pressure regulator 17 which is a valve regulated electro-magnetically in accordance with the opening of the engine throttle. The PM circuit 22 is connected to all trimmers, except the lockup trimmer LUT, on that side of its piston which is remote from the charging pressure; thus the oil displaced from a trimmer while it is being charged will be discharged into the PM circuit 22 to escape at a port in the modulator pressure regulator without materially raising the value of PM as set by the regulator. When the throttle is shut pressure PM is zero and when the throttle is opened beyond a certain point in its range pressure PM has a predetermined value. Its effect on a trimmer is to supplement the force of its loading spring, thus increasing its charging pressure and consequently increasing the transitional pressure applied to an incoming brake. PM also increases the discharging pressure in a trimmer which consequently increases the transitional pressure being maintained in the outgoing brake. In this way the brakes involved in a gearshifting operation are enabled to hold the higher transitional torque reactions resulting from the greater opening of the engine throttle. For the same reason PM pressure is extended to bias the main pressure regulator MPR at the righthand end of piston portion 37f (FIG. 2) to enhance the value of P1 and Pk pressures accordingly. When the master controller is in neutral and the vehicle stationary, the brake B4 is pressurised but at a reduced value since P2 is at its minimum value, neither C1 nor C2 pressure being applied to the P2 regulator P2R. When the master controller is moved to any of the forward drive positions D,P1 pressure is applied to line 51 (FIG. 2) to generate the pressure C1 which immediately engages the forward clutch through a relay valve (not shown) controlling the supply of maximum throttle opening P1 pressure to the forward clutch. At the same time, the effect of applying P1 pressure to the line 51 is to cause the P2 regulator to increase the value of P2 and thus, proportionately, the pressure in the first speed brake BR4.

Similarly, the reverse clutch may be correspondingly controlled by a relay valve (not shown) in conjunction with a trimmer valve (not shown) similar to the trimmer valves of the brakes.

The rate at which the pressure in each trimmer increases can be individually regulated by selecting the size of its constricted supply in relation to the volume of oil required to displace its piston.

ELECTRONIC CONTROL

FIG. 7 shows modifications which may be made to the control system described above when gear shifts are to be initiated electronically.

The governor and the shift signal valves are replaced by electronic means for speed sensing and by solenoid valves for automatic selection of the gear ratios as directed by the electronic speed sensing means. An electronic control unit 701 processes speed signals received from electromechanical speed sensors 702 and 703 driven respectively from the engine and the output member of the transmission. It also processes signals received from the master controller 715 and from switch devices associated with the engine throttle and responsive to its position.

The master controller 715 is now a set of electrical switches with multiple contacts which are set in accordance with the position in which the controller is set by the driver. Some of the functions of the manual selector valve MSV are now performed by the forward and reverse solenoid valves FSV and RSV. The function of the shift point regulator SPR is now performed by the control unit 701 in accordance with the particular circuits closed by the master controller 715 in any of its positions from D1 to D6. Similarly the two functions of the brake-and-kick down regulator BKR are performed by the electronic control unit 701, the "braking" condition being imposed on the gear selecting devices when the master controller 715 is in its B position and the "kick down" condition being imposed by the switch device 21. The lock up shift valve LSV is replaced by a lock-up solenoid valve LUSV.

The various solenoid-operated valves are supplied by a line 767 with oil at a constant pressure ensured by a solenoid feed regulator valve SFR similar in construction and operation to the Pc regulator PCR in FIG. 2, corresponding elements being indicated with reference numerals increased by 700.

When the engine throttle is in its idling or shut position, the PM solenoid valve SM is operated to deliver Ps pressure to a line 790 to act on a piston 791 of a modulator valve 721 to move the piston 791 and with it the regulating valve member 792 to a position in which the line 22 is connected to exhaust, thereby making PM equal to zero. When the throttle is opened by a predetermined amount, the valve SM removes the pressure from the line 790, the piston 791 returns to the left and the valve member 792, in conjunction with its control spring 793, then acts as a regulating valve (similar to the valve SFR) to deliver a constant pressure PM to the line 22.

When the master controller 715 is set to its position L for low forward gear, it applies current to the line SL to energise the low solenoid signal valve LSV to cause the circuit 192 to engage brake BR5 and release brake BR4. If the vehicle speed becomes too great to be appropriate for low gear, or the master controller is moved into to one of the D positions, the solenoid valve LSV is de-energised, the forward solenoid valve FSV remains energised and, at low or zero vehicle speed, each of the four shift signal valves SSSV will be energised so that each of the corresponding shift valves is held in its downshift position so that the first speed brake BR4 is engaged as with the arrangement shown in FIGS. 1 to 6. As the vehicle speed increases, a point will be reached in which the control unit 701 will cause the shift signal solenoid valve SSSV1-2 to change state thereby removing Ps pressure from a line 712 leading to the shift valve SV1-2 which correspondingly changes state to its up shift condition as a result of which the brake BR3 is engaged and the brake BR4 released. The actual value of vehicle speed at which this gear shift occurs and similarly for the higher gear shifts will depend on the chosen setting of the master controller 715 being relatively low for the position D1 and relatively high for the position D6 corresponding respectively to lower and higher engine speeds.

Thus, with increasing road speed, the transmission will shift automatically upwards and the lock-up clutch LU will in due course be engaged at a road speed which will again be determined by the setting of the master controller.

When the master controller is set in neutral, neither of the valves FSV and RSV will be energised so that both clutches K1 and K2 will be released and no drive can be transmitted by the transmission.

When the master controller 715 is set to one of its reverse positions R or RL, the reverse solenoid valve RSV will be energised to cause a reverse shift valve RSV to engage the reverse clutch K2. At the same time the control unit will cause either brake BR4 (in the higher reverse gear R) or the brake BR5 in the low reverse gear RL to be engaged.

It will be appreciated that the electronic control unit can be constructed in accordance with techniques which are well known in the art. In accordance with one such technique, the control unit is effectively an electronic analogue of the hydraulic circuit including the shift signal valves SSSV of FIG. 5, these valves being replaced by comparator circuitry. In accordance with another such technique, the control unit includes a microprocessor, such as an Intel 8085 to which the various signals from the governor 14 control 15 and other drivers controls are fed through, adaptors and a data base, and appropriate program memories. Examples of both such techniques will be found for example in British Patent specification No. 2055999A.

I claim:

1. A control system for a multi-ratio gearing for automatically causing shifting between ratios of the gearing at threshold rotational speeds in response to variations in rotational speed in the gearing, in which a driver-operated control is provided and positionable in at least three different selected settings for biasing the control system to raise or lower the threshold rotational speeds to define several optional levels of threshold speeds at which shifts between ratios are initiated, and the raised and lowered threshold speeds are unaffected by power applied to the gearing over a normal power range, the selected setting of the driver-operated control being effective over a range of inter-ratio changes.

2. A control system according to claim 1, in which shifts between adjacent ratios are initiated by fluid-operated valves having valve members subjected to fluid pressures which vary as functions of the said speed, and wherein the driver-operated control is arranged to vary a biassing fluid pressure as applied to biassing pressure areas of said valve members.

3. A control system according to claim 2 and including a driver-operable disabling control operable to remove the bias exerted on the system by the driver-operated control in order to retain the gearing in its engaged ratio over a wide speed range.

4. A control system according to any one of claims 1 to 3 for a transmission comprising said multi-ratio gearing and a torque converter having a lock-up clutch for the torque converter, wherein the control system including means for engaging the clutch, and wherein the driver-operated control is effective to adjust the speed at which the lock-up clutch is engaged.

5. A control system according to claim 1 for use with a driving motor having a maximum service speed determined by a governor at a value below the maximum safe speed of the motor, wherein the driver-operated control has an additional output-braking position for sufficiently biassing the control system to the extent that input speed to the gearing may exceed the said governed speed but will not reach the said maximum safe speed before an upshift is caused.

6. A control system for a multi-ratio automatic transmission for automatically causing changes between ratios in a range of ratios up to a highest ratio in response to variations in strength of an output signal from an output-speed-responsive governor of the transmission, wherein the strength of the output signal from the governor decreases with increasing output speed, and the control system is arranged to respond to the decreasing signal strength by correspondingly upshifting the transmission and to respond to absence of said signal by upshifting the transmission to the highest ratio in the said range.

7. A control system according to claim 6, wherein the governor exerts a centrifugally generated force on a fluid pressure reducer valve which provides the governor output signal as a fluid pressure which decreases with increasing governor speed.

8. A control system according to claim 6 or 7, and including a cascade of shift-initiating devices each effective for causing shifts between a pair of adjacent ratios in the range, wherein with zero governor output signal each shift initiating device adopts an upshift condition and with increasing governor output signal strength the shift initiating devices in the cascade successively adopt a down-shift condition.

9. A multi-ratio automatic transmission in which different ratios are selected by hydraulically engaging friction means under control of hydraulically energised control means, wherein hydraulic power for energising the control means and actuators for engaging the friction means are derived from a common source and wherein the actuators are supplied from a feeding circuit through relay valves controlled by the control means, a main pressure regulator is arranged to maintain substantially full working pressure in a priority pressure circuit, the priority pressure circuit is connected to the relay valve supply ports through a constricted passage for each relay valve, and non-return valve means are arranged to prevent flow through the constricted passages to the feeding circuit, the arrangement being such that the pressure in the priority circuit can maintain the pressure in the actuator of an engaged friction means despite a reduction in pressure in the feeding circuit when the latter is required to supply a relatively large and unrestricted flow to take up slack in another actuator with a view to engagement of the friction means associated with the said other actuator.

10. A hydraulically energised multi-ratio automatic transmission having means for initiating up- and downshifts between two adjacent ratios in response to predetermined increases and reductions respectively in output speed, each ratio being engaged by engagement of a friction device associated with each ratio, wherein a supply of hydraulic fluid to each friction device from a high pressure source is controlled by relay valve which is operated by a lower pressure supplied by shift timing means and the pressure in the friction device is regulated by the relay valve to be maintained at a value which is substantially a constant multiple of the said lower pressure supplied by the shift timing means.

11. A transmission according to claim 10, wherein the shift-timing means includes a trimmer valve having a valve member movable by the lower pressure against a resilient bias.

12. A transmission according to claim 11, wherein the relay valve comprises a control valve member having oppositely facing areas subjected respectively to the pressure in the associated friction device and the trimmer valve, and control valve member is movable on unbalance to return to balance by adjusting the pressure in the friction device.

13. A control system for a multiple-ratio gearing in which ratios are engaged by fluid-pressure-operated actuators and changes between two ratios are effected by engaging an actuator associated with one ratio and releasing an actuator of another ratio, wherein the control system includes shift timing means for determining, during an upshift, an increase and a decrease respectively in the pressures in the higher ratio actuator and the lower ratio actuator, and a shift timing valve associated with the two ratios, the shift timing valve being responsive to the pressure in the higher-ratio actuator so as to effect the quick release of the remaining pressure in the lower-ratio actuator when the pressure in the higher-ratio actuator exceeds a predetermined value, whereas initiation of a downshift causes the associated shift timing valve immediately to effect a quick release of the pressure in the higher-ratio actuator, the rate of increase of pressure in the lower ratio being then determined by the shift timing means.

14. An automatic transmission for a vehicle having an engine and a throttle therefor, comprising an input member, an output member, a multi-ratio gearing interconnecting the input and output members, a plurality of friction means for selectively engaging respective ratios of the gearing, fluid pressure operated actuators for operating said friction means, a source of fluid under pressure, a pressure regulator for maintaining from said source a substantially full high working pressure in a priority circuit, a control system for automatically causing changes between ratios of the gearing at threshold rotational speeds in response to variations in rotational speed in the gearing, the control system including a driver operated control having a selected setting for biassing the control system to raise or lower the threshold rotational speeds at which changes are initiated, the threshold rotational speeds being unaffected by engine load or by throttle position over the normal range thereof, the selected setting of the control being effective over a range of inter-ratio changes, and a governor for detecting the rotational speed of said output member, said governor being constructed to deliver to said control system an output signal of variable strength, the strength of said output signal decreasing with increasing output speed, and said control system being arranged to respond to the decreasing signal strength by correspondingly upshifting the transmission and to respond to absence of said signal by upshifting the transmission to its highest ratio in the said range, fluid power for energising both the control system and the actuators for engaging the friction means being derived from the same source, the actuators being supplied at high pressure from a feeding circuit through relay valves operated at lower pressure by the control system, the priority pressure circuit being connected to the relay valve supply ports through a constricted passage for each relay valve, and non-return valve means being arranged to prevent flow through the constricted passages to the feeding circuit, the arrangement being such that the pressure in the priority circuit can maintain the pressure in the actuator of an engaged friction means despite a reduction in pressure in the feeding circuit when the latter is required to supply a relatively large and unrestricted flow to take up slack in another actuator with a view to engagement of the friction means associated with the said other actuator, said control system including shift timing means for operating said relay valves at a lower pressure such that the pressure in an operated friction means is regulated by the relay valve to be maintained at a value which is substantially a constant multiple of the said lower pressure supplied by the shift timing means, the shift timing means being adapted to determine during an upshift the respective increase and reduction in the pressure in the higher ratio actuator and the lower ratio actuator, and including a shift timing valve associated with the two ratios, the shift timing valve being responsive to the pressure in the higher-ratio actuator so as to effect the quick release of the remaining pressure in the lower-ratio actuator when the pressure in the higher-ratio actuator exceeds a predetermined value, whereas initiation of a downshift causes the associated shift timing valve immediately to effect a quick release of the pressure in the higher-ratio actuator, the rate of increase of pressure in the lower ratio being then determined by the shift timing means.

15. In an automatic transmission for a vehicle having an engine connectible to the transmission and controlled by a throttle, said transmission including rotatable input and output members, multi-ratio gearing means connectible between said input and output members, said multi-ratio gearing means defining a range of selectable ratios, and means for selectively engaging respective ratios of said gearing means, the improvement comprising control means for automatically causing shifting between ratios of the gearing at threshold rotational speeds in response to variations in rotational speed of said output member, said control system including biassing means for selectively raising or lowering the threshold rotational speeds to define several optional levels of threshold speeds at which shifts between ratios are initiated, said biassing means defining an intermediate level of threshold speeds for gear shifting and at least one lower level of threshold speeds for gear shifting to enable the engine to develop more power through the range of gear ratios and at least one higher level of threshold speeds for gear shifting to yield improved fuel economy throughout the range of gear ratios, said biassing means including a driver-operated control which is positionable in at least three different selected settings for permitting selection over the different optional levels of threshold speeds, each selected optional level of threshold speeds being effective over a range of inter-raatio changes, said control means and said biassing means being unaffected by throttle position or load at least over the normal range thereof so that the selected level of threshold speeds is also unaffected.

16. A transmission according to claim 15, wherein said biassing means includes pressure regulator means coupled to and progressively moved in response to progressive movement of said driver-operated control from lower threshold speeds to higher threshold speeds to provide a driver-controlled pressure which correspondingly progressively increases as the driver-controlled operator progressively moves towards its highest threshold speed setting, said control system also including shift valve means for controlling upshift and downshift between two adjacent ratios, said shift valve means including an axially shiftable valve member having a constant pressure applied against one end area thereof and said driver-controlled pressure applied against at least one other end area thereof, and means for creating a varying pressure which varies in predetermined relationship to variations in the speed of said output member, said varying pressure being applied against a further end face of said valve member, whereby said pressures create an unbalance for effecting shifting of said valve member to in turn control shifting between said adjacent ratios.

17. A transmission according to claim 16, wherein said varying pressure progressively decreases as the speed of said output member progressively increases.

18. A transmission according to claim 17, wherein said shift valve means includes a shift signal valve having said valve member associated therewith and coupled to and controlling a main shift valve, said constant pressure being supplied from said shift signal valve when activated to said main shift valve to effect shifting between the adjacent ratios.

19. A transmission according to claim 15, wherein said gearing includes at least five forward speed ratios, and wherein said biassing means and said driver-operated control has at least six selectable settings for defining at least six optional levels of threshold speeds.

20. A control system for a multi-ratio automatic transmission, comprising means for automatically causing changes between ratios in a range of ratios up to a highest ratio, governor means for sensing the output speed of said transmission, means responsive to said governor means for creating an output signal having a strength which decreases in response to increasing output speed, and means responsive to said output signal for causing upshifting of the transmission in response to a decreasing in the strength of said output signal and for upshifting the transmission to its highest ratio in response to the absence of said output signal.

* * * * *

UNITED STATES PATENT AND TRADEMARK OFFICE
CERTIFICATE OF CORRECTION

PATENT NO. : 4 468 987
DATED : September 4, 1984
INVENTOR(S) : Albert A. Miller

It is certified that error appears in the above—identified patent and that said Letters Patent is hereby corrected as shown below:

Column 18, line 42; change "centrifugally generated" to ---centrifugally-generated---.

Column 18, line 52; change "shift initiating" to ---shift-initiating---.

Column 19, line 15; after "by" insert ---a---.

Column 19, line 29; after "and" insert ---the---.

Column 21, line 7; change "raatio" to ---ratio---.

Column 18, line 50, "shift initiating" should read -- shift-initiating --.

Signed and Sealed this

Twenty-sixth Day of March 1985

[SEAL]

Attest:

DONALD J. QUIGG

Attesting Officer  Acting Commissioner of Patents and Trademarks